Feb. 6, 1968　　　C. E. QUINN　　　3,368,213
LIQUID LEVEL INDICATOR
Filed Dec. 10, 1964

INVENTOR.
Clark E. Quinn
BY
Hugh L. Fisher
ATTORNEY

United States Patent Office 3,368,213
Patented Feb. 6, 1968

3,368,213
LIQUID LEVEL INDICATOR
Clark E. Quinn, Rochester, Mich., assignor to General Motors Corporation, Detroit, Mich., a corporation of Delaware
Filed Dec. 10, 1964, Ser. No. 417,438
15 Claims. (Cl. 340—244)

ABSTRACT OF THE DISCLOSURE

A liquid level indicator having a flexible reed positioned within a liquid reservoir at the level to be monitored. A driving electromagnet is selectively and instantaneously energized to produce a single deflection of the reed so that the reed will vibrate freely at its natural frequency when the liquid is below the level to be monitored. Thereafter, the driving electromagnet is deenergized and a sensing electromagnet responds to these vibrations of the reed and develops an AC output which is utilized to illuminate an indicator lamp.

---

This invention relates to improvements in liquid level indicators.

The electromagnetic type liquid level indicator has pronounced advantages since it is not generally influenced by vibration or acceleration effects. This type indicator does, however, require electric power and then too, because of the magnetic fields, particles in the liquid can become magnetized and attracted to any of the immersed components and produce a residue. This residue interferes with the ability of the indicator to produce accurate results.

To overcome these problems and others, a new and different liquid level indicator is proposed that employs electric power only for the time interval required to initiate vibration of a vibrational member. The vibrational characteristics of the member are such that a certain vibratory movement results in the absence of liquid; whereas when liquid is present and the member is immersed therein, this vibratory movement is substantially reduced. This vibratory movement occurring in the absence of liquid is sensed and warns an observer that the liquid is below the critical level.

The invention further contemplates a liquid level indicator that employs a unique arrangement of driving and driven or sensing electromagnets that demands a minimum of operating power. Moreover, this minimum is required only for a very short time interval.

More specifically, the invention contemplates a liquid level indicator in which a vibrational member, exposed to the liquid to be detected, is given an initial deflection by an electromagnet so as to initiate vibratory movement thereof if there is an absence of liquid at the level to be detected. This vibratory movement is sensed by another electromagnet and a corresponding output is utilized to provide a visual read-out.

The foregoing and other objects and advantages of the invention will become apparent from the following description and from the accompanying drawings, in which.

Figure 1:
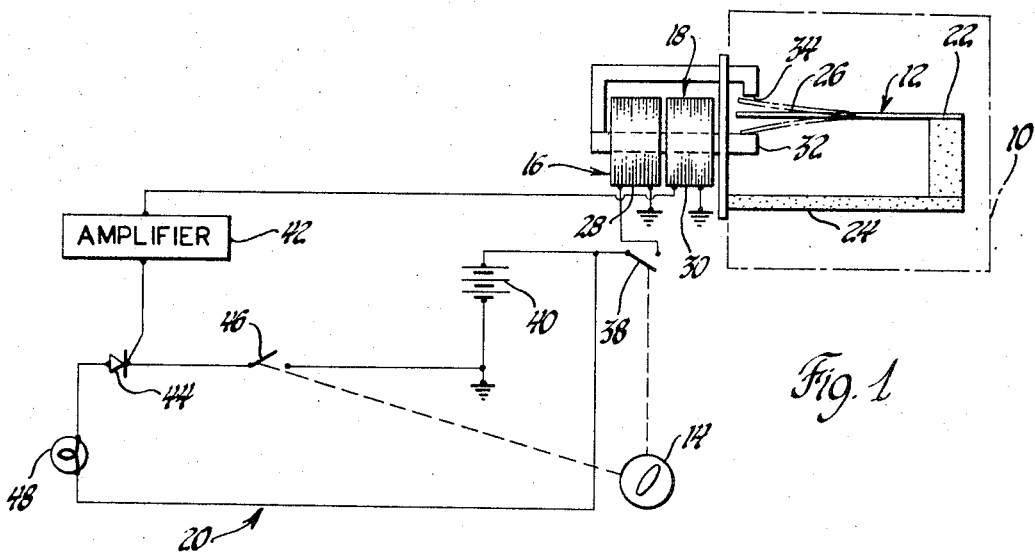
FIGURE 1 illustrates schematically an indicator incorporating the principles of the invention.

Referring now to the drawings and initially to FIGURE 1, the numeral 10 denotes a reservoir for a liquid whose level is to be monitored or detected. The indicator 10 is suitably secured to the liquid reservoir and has a vibrational member, in this embodiment a flexible reed 12, located within the reservoir 10 and at the level to be detected. In a way to be further described, whenever the liquid level is to be checked, a control 14 is operated to energize a driving electromagnet 16. The driving electromagnet 16 will deflect the flexible reed 12 and, if there is an absence of liquid at the critical level, the flexible reed 12 will vibrate at its natural frequency. A driven or sensing electromagnet 18 will sense these vibratory movements of the flexible reed 12 and develop corresponding electric impulses that will actuate an indicating circuit, shown generally at 20, to provide a visual warning that the liquid is below the critical level. If the liquid level is proper, the flexible reed 12 will be immersed therein and not permitted to have vibratory movements to the extent that they will develop electric impulses of a sufficient amplitude to be detected.

The flexible reed 12 is formed of a metal that permits the proper vibratory movement once the reed 12 is deflected. This metal can be some type of high carbon steel and also is relatively insensitive to the temperature of the liquid. The reed 12 has an end 22 fixed to a support 24 that extends inside the reservoir 10 and that is made of a suitable insulator material so that the reed 12 will not become a part of the magnetic circuit. A free end 26 of the reed 12, when deflected, will cause the reed 12 in the absence of liquid to vibrate at its normal frequency. If, on the other hand, the reed 12 is immersed in the liquid, the reed flexibility is such that once the reed 12 is initially deflected vibratory movement will be quickly damped or even preferably prevented.

The driving electromagnet 16 and the sensing electromagnet 18 respectively comprise driving and sensing coils 28 and 30 wound on a common C-shaped core 32. The C-shaped core 32 extends into the reservoir and is provided with a gap at 34, which receives the end 26 of the flexible reed 12. The core 32 is preferably formed of a suitable ferromagnetic material so that when the driving coil 28 is energized a magnetic circuit including the gap 34 will be provided for the resultant magnetic flux. To produce this energization the control 14 is operated to close a switch 38 and connect the driving coil 28 to an energy source, such as a battery 40. By the appropriate selection of parameters and materials the end 26 of the flexible reed 12 will be urged, e.g., downwardly, to provide a deflection or what might be termed a "plucking" of the reed 12 so as to initiate the vibratory movement. The control 14 immediately thereafter opens the switch 38 so that the driving coil 28 is deenergized. Hence, the control 14 can be some kind of rotary actuator that quickly closes and opens the switch 38 so as to only produce a single deflection of the flexible reed 12.

The material of the core 32 has sufficient retentivity to maintain a residual flux within the magnetic circuit for a time interval adequate to operate the sensing electromagnet 18; i.e., energize the sensing coil 30. Therefore, if the flexible reed 12 is permitted to vibrate at its natural frequency due to the absence of liquid at the critical level, the magnetic lines of force across the gap 34 will be altered by the vibrating movement of the reed end 26 and accordingly alter the energization of the sensing electromagnet 18 such that the sensing coil 30 will produce electric impulses that are oscillatory and that gradually attenuate as the vibrations of the flexible reed 12 diminish.

These electric impulses, if it is necessary, can be increased by a conventional amplifier 42 and then used to operate the indicator circuit 20. The coupling of the amplifier 42 to the indicator circuit 20 is through a switch device, such as a silicon controlled rectifier 44. The silicon controlled rectifier 44 has its gate electrode connected to the output of the amplifier 42, and when these electric impulses occur they will upon amplification cause the silicon controlled rectifier 44 to saturate and complete the indicator circuit 20. The same control 14 for the switch 38 operates another switch 46 in the indicator circuit in a sequence that closes the switch 46 when the switch 38 is opened. This connects an indicating lamp 48 to the battery 40 through the silicon controlled rectifier 44 so as to illuminate it. Of course, when the control 14 is operated and the liquid is at the proper level, electric impulses will not be developed and the silicon controlled rectifier 44 accordingly will not be turned on. Hence, the check will not illuminate the indicator lamp 48 and the observer will know that the liquid level is proper.

Summarizing briefly the operation of the FIGURE 1 indicator during a checking cycle, the control 14 is initially operated to, in sequence, close switch 38, open switch 38, and then close switch 46 in the indicating circuit 20. This energizes the driving coil 28 and activates the magnetic circuit so that magnetic lines of force extend across the gap 34 and produce the "plucking" or single deflection of the end 26 of the flexible reed 12. This magnetic circuit is retained so that impulses are developed in the sensing coil 30 if the liquid is below the critical level and the flexible reed 12 can vibrate at its normal frequency. Consequently, these amplified impulses will turn on the silicon controlled rectifier 44 and the lamp 48 will be illuminated to provide the warning. If the liquid is at the proper level, the flexible reed 12 will have its movements quickly damped and the electric impulses will not be generated, at least of an amplitude sufficient to turn on the silicon controlled rectifier 44.

Several of these indicators can be located in the various reservoirs for a power plant. With a motor vehicle as exemplary, the reservoir for the power steering fluid, the engine crankcase and the coolant reservoir all would incorporate one of these indicators. The control 14 then could be modified to sequentially check each reservoir in a way well understood by those versed in the art.

Figure 2:
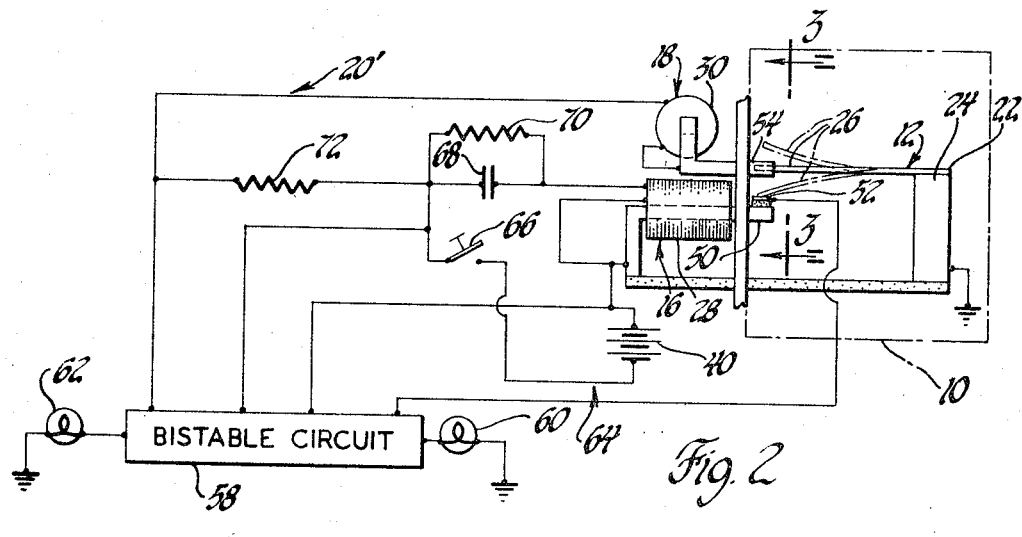
FIGURE 2 is a schematic diagram of a somewhat different indicator.

The FIGURE 2 indicator has both a different electromagnetic arrangement and a different read-out and also permits the operation of the flexible reed to be monitored. Where appropriate, the FIGURE 1 numbers will be again used. The driving electromagnet 16 and the sensing electromagnet 18 are in this FIGURE 2 embodiment separated from each other and the sensing electromagnet is arranged at right angles to the driving electromagnets 16; i.e., the axes of the coils 28 and 30 are quadrature related, so as to minimize any possible interference. The driving electromagnet 16 has its coil 28 wound on a core 50 with the end extending within the reservoir 10 and adjacent the end 26 of the reed 12. Secured to the end of the core 50 and insulated therefrom is a contact 52. Energization of the driving coil 28 by the battery 40 will, due to the magnetic attractive forces resulting therefrom, urge the end 26 of the reed 12 downwardly and into engagement with the contact 52. With the support 24 grounded, the operator in a way to be explained will know that the flexible reed 12 is properly operating.

Figure 3:
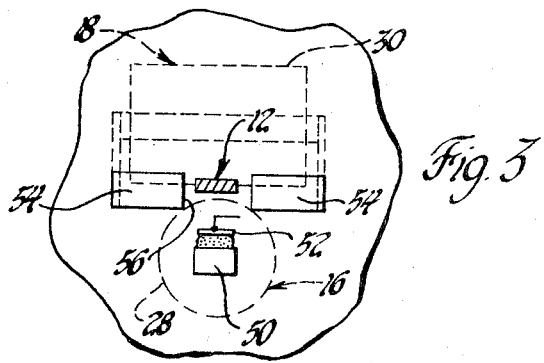
FIGURE 3 is a view of the FIGURE 2 electromagnets, looking in the direction of arrows 3—3.

The sensing electromagnet 18 has the coil 30 therefor wound on a C-shaped core 54 that is provided with a gap at 56, as viewed in FIGURE 3. This gap 56 is in the path of vibratory movement of the reed end 26 so that the vibratory movements of the reed 12 will alter the flux concentration in the gap 56 and provide the electric impulses for read-out purposes.

The indicator circuit 20' employs a bistable circuit 58, such as a conventional flip-flop, that derives its B+ voltage from the battery 40 and in the other state energizes an OK-liquid lamp 60 and in the other state energizes a no-liquid lamp 62. Hence, the electric impulses from the sensing coil 18 will place the bistable circuit 58 in its no-liquid state and illuminate the lamp 62. To place the bistable circuit 58 in its OK-liquid state, the driving electromagnet 16 is energized so that the flexible reed 12 engages the contact 52, which is connected to the bistable circuit 58 so that the resultant grounding will cause the OK-liquid lamp 60 to be illuminated.

The driving electromagnet 16 is provided with an energizing circuit, generally denoted by the numeral 64. This circuit 64 includes the battery 40, a push button switch 66, a capacitor 68, and a parallel resistor 70. The closing of the push button switch 66 will commence to charge the capacitor 68 to the potential of the battery 40 and as a result produce current flow through the driving coil 28. An end of the driving coil 28 is connected to the grounded support 22 to provide the complete circuit.

When the capacitor 68 becomes charged, current flow subsides and the driving coil 28 is deenergized. In the meantime, however, the free end 26 of the flexible reed 12 is deflected downwardly due to the magnetic attractive force and into engagement with the contact 52. This resets the bistable circuit 58 in its OK-liquid state and also provides the deflection needed to initiate the vibratory movements of the flexible reed 12 in the event that the liquid is below the critical level. The parallel resistor 70 provides a discharge path for the capacitor 68 when the push button switch 66 is subsequently opened after the liquid level has been checked.

The same direct current current from the battery 40 is used to magnetize the core 54 for the sensing electromagnet 18. This is accomplished by connecting a shunt resistor 72 between the indicating circuit 20' and the capacitor 68. Hence, the direct current, when the push button 66 is closed, flows also through the shunt resistor 72 to the sensing coil 30 and the magnetic circuit across the gap 56 is activated. If the liquid level permits vibratory movement of the flexible reed 12, the resultant variations in the magnetic flux across the gap 56 will be sensed by the coil 30 and an oscillating or alternating current component will be added to direct current derived from the battery 40. This alternating current component will, as mentioned, cause the bistable circuit 58 to change to the no-liquid state and illuminate the lamp 62.

The resistor 72 serves both as a dropping resistor, i.e., it reduces the DC excitation of the sensing coil 30 so that the magnetic field across the gap 56 is not strong enough to maintain the reed end 26 stationary within the gap 56, and also prevents the alternating current developed by the vibratory movement of the flexible reed 12 from flowing into the energizing circuit 64. An appropriate choke coil could be used if wanted to give this isolation as well as voltage drop.

Briefly describing the operation of the FIGURE 2 indicator, the first action required is the closing of the push button switch 66. The battery 40 will now start to charge the capacitor 68 and the resultant current flow will energize the driving electromagnet 16. The direct current from the battery 40 is also supplied through the shunt resistor 72 to energize the sensing electromagnet so that its magnetic circuit is rendered operative.

The energization of the driving electromagnet 16 deflects the reed end 26 downwardly and into engagement with the contact 52. This resets the bistable circuit 58 and places it in its OK-liquid state in which the lamp 60 is illuminated. If the lamp 60 does not illuminate, the observer knows that the flexible reed 12 is broken or is in some way malfunctioning. Assuming that the flexible reed 12 is properly operative, as soon as the capacitor 68 is charged, the current flow to the driving electromagnet 16 subsides and the driving electromagnet 16 is deenergized.

If there is an absence of liquid at the critical level, the flexible reed 12 will now be permitted to vibrate at its natural frequency and cause the sensing electromagnet 18 to generate the alternating current component that will switch the bistable circuit 58 to its no-liquid state and illuminate the warning lamp 62. Of course, if the level of the liquid is proper the vibratory movement of the reed 12 is quickly damped and the electric impulses do not occur.

Upon the completion of the check of the liquid level the push button switch 66 is permitted to open. Consequently, the capacitor 68 discharges through the resistor 70 and the indicator is prepared for another check in the foregoing manner.

From the foregoing it will be appreciated that the liquid level indication is done without continuous power and no permanent magnet is needed. Only an initial "plucking" of the flexible reed 12 is required to obtain a visual read-out. This not only conserves power but avoids the problems of residue collection in the gap area and on the end 26 of the flexible reed 12. The tendency for residue to collect is discouraged by the "plucking" from time to time to obtain the visual read-out. Then too, only the flexible reed 12 and the portion of the core defining the gap need to be in the reservoir. All other parts of the indicator can be completely outside of the reservoir, thus eliminating assembly problems and negating the need to alter substantially the reservoir.

The invention is to be limited only by the following claims.

What is claimed is:

1. In a liquid level indicator, the combination of a reservoir for liquid, vibrational means operatively positioned relative to the reservoir so as to be exposed to the liquid when at a certain level to be detected, the vibrational means being capable of vibratory movements in the absence of liquid at the certain level, driving means selectively and instantaneously operative to deflect the vibrational means so that the vibratory movements occur freely without further operation of the driving means when the liquid is below the certain level, and indicating means rendered operative when the vibratory movements occur.

2. In a liquid level indicator, the combination of a reservoir for liquid, vibrational means operatively positioned relative to the reservoir so as to be exposed to the liquid when at a certain level to be detected, the vibrational means being capable of vibratory movements at the natural frequency thereof in the absence of liquid at the certain level, driving means selectively and instantaneously operative to deflect the vibrational means so as to initiate the vibratory movements, the vibratory movements continuing thereafter freely without further deflection by the driving means when the liquid is below the certain level, means sensing the continuing vibratory movements and indicating that the liquid is below the certain level.

3. In a liquid level indicator, the combination of a reservoir for liquid, vibrational means operatively positioned relative to the reservoir so as to be exposed to the liquid when at a certain level to be detected, the vibrational means being capable of predetermined vibratory movements in the absence of liquid at the certain level, driving means selectively and instantaneously operative to deflect the vibrational means so as to initiate the vibratory movements, the vibratory movements continuing with the driving means inoperative when the liquid is below the certain level, means sensing the continuing vibratory movements of the vibrational means and operative to develop a corresponding output, and indicating means energized by the output corresponding to that occurring when the liquid is below the certain level.

4. In a liquid level detector, the combination of a reservoir for liquid, vibrational means operatively positioned relative to the reservoir so as to be exposed to the liquid when at a certain level to be detected, the vibrational means being capable of predetermined vibratory movements in the absence of liquid at the certain level, electromagnetic driving means selectively and instantaneously operative to deflect the vibrational means and initiate the vibratory movements thereof, the vibratory movements continuing with the electromagnetic driving means inoperative when the liquid is below the certain level, electromagnetic sensing means operative in response to the continuing vibratory movements to generate corresponding electric impulses, and indicating means actuated by the electric impulses to indicate that the liquid is below the certain level.

5. In a liquid level indicator; the combination of a vibrational member operatively supported within the reservoir so as to be exposed to the liquid when at a certain level to be detected; the vibrational member being constructed and arranged so as to be in the absence of liquid at the certain level capable of vibratory movements from a normal undeflected position and so as to be in the presence of liquid at the certain level relatively incapable of vibratory movement due to the dampening effect of the liquid; driving means including an electromagnet operative when energized to deflect the vibrational member from the normal undeflected position thereof so as to initiate the vibratory movements thereof when the liquid is below the certain level and means selectively and instantaneously energizing the electromagnet so as to produce a single deflection of the vibrational member and thereafter deenergizing the electromagnet; sensing means including an electromagnet so arranged relative to the vibrational member as to respond to the vibratory movements thereof and develop corresponding electric impulses; and means actuated by the electric impulses to indicate the absence of liquid at the certain level.

6. In a liquid level indicator; the combination of a reservoir for liquid; a vibrational reed operatively positioned in the reservoir so as to be exposed to the liquid when at a certain level to be detected; the vibrational reed being constructed and arranged so as to be in the absence of liquid capable of vibratory movement from a normal undeflected position and so as to be in the presence of liquid relatively incapable of vibratory movement due to the dampening effect of the liquid; driving means for the vibrational reed; the driving means including an electromagnet operatively associated with the vibrational reed so as to deflect the vibrational reed when energized and thereby initiate the vibratory movements thereof when there is an absence of liquid at the certain level and means selectively and instantaneously energizing the electromagnet so as to produce a single deflection of the vibrational reed and thereafter deenergizing the electromagnet; means sensing vibratory movements of the vibrational reed; the sensing means including another electromagnet operatively associated with the vibrational reed so as to generate electric impulses corresponding to the vibrational movements; switching means actuated by the electric impulses; and indicating means rendered operative by the switching means to indicate that the level of the liquid is below the certain level.

7. In a liquid level indicator, the combination of a reservoir for liquid, vibrational means operatively positioned relative to the reservoir so as to be exposed to the liquid when at a certain level to be detected, the vibrational means being capable of vibratory movements in the absence of liquid at the certain level, driving and sensing electromagnets having a common core, the common core having a gap embracing the vibrational means, selectively operable means energizing the driving electromagnet for a certain time interval adequate to generate a residual magnetic flux in the core and also to produce a single deflection of the vibrational means and thereafter deenergizing the driving electromagnet, the sensing electromagnet developing an output when the vibrational means commences vibrational movement due to the absence of liquid, and indicating means responsive to the output for indicating the absence of liquid at the certain level to be detected.

8. In a liquid level indicator, the combination of a reservoir for liquid, a vibrational reed supported at one end and so positioned in the reservoir as to be exposed to the liquid when at a certain level to be detected, the vibrational reed having a free end thereof constructed and arranged so as to be in the absence of liquid capable of vibratory movements from a normal undeflected position and so as to be in the presence of liquid relatively incapable of vibratory movement due to the dampening effect of the liquid, driving and sensing electromagnets having a common core, the common core having a gap so positioned within the reservoir as to have the free end of the vibrational reed movable therein when deflected, selectively operable means energizing the driving electromagnet for a certain time interval adequate to generate a residual magnetic flux in the core and also so as to produce a single deflection of the vibrational reed from the normal undeflected position and thereafter deenergizing the driving electromagnet, the sensing electromagnet developing an output when the vibrational reed commences vibrational movement due to the absence of liquid, switching means rendered operative by the output, and indicating means actuated by the switching means when operative to indicate the absence of liquid at the certain level to be detected.

9. In a liquid level indicator, the combination of a reservoir for liquid, a vibrational reed supported at one end and so positioned in the reservoir as to be exposed to the liquid when at a certain level to be detected, the vibrational reed having a free end thereof constructed and arranged so as to be in the absence of liquid capable of vibratory movement from a normal undeflected position and so as to be in the presence of liquid relatively incapable of vibratory movement, driving and sensing electromagnets having a common core, the common core having a gap for reception of the free end of the vibrational reed, selectively operable means instantaneously energizing the driving electromagnet so as to provide a residual magnetic circuit extending through the gap and also to deflect the vibrational reed from the normal undeflected position and thereafter deenergizing the driving electromagnet, the sensing electromagnet being operative to develop electric impulses corresponding to vibratory movement of the reed when there is an absence of liquid, an indicator circuit comprising a visual indicating device, an energy source and a controlled rectifier having the gate electrode communicating with the sensing electromagnet so that the electric impulses will render said controlled rectifier conductive and complete the indicator circuit to visually indicate that the level of the liquid is below the certain level to be detected.

10. In a liquid level indicator, the combination of a reservoir for liquid, vibrational means operatively positioned within the reservoir so as to be exposed to the liquid when at a certain level to be detected, the vibrational means being capable of vibratory movements in the absence of liquid at the certain level, driving means selectively and instantaneously operative to deflect the vibrational means so as to initiate vibratory movements, the vibratory movements continuing with the driving means inoperative when the liquid is below the certain level, means sensing the vibratory movements and indicating that the liquid is below the certain level, and means monitoring operation of the vibrational means.

11. In a liquid level indicator, the combination of a fluid reservoir, vibrational means operatively positioned within the reservoir so as to be exposed to the liquid at a certain level to be detected, the vibrational means being so constructed and arranged as to be capable of vibratory movement from a normal position in the absence of liquid, driving electromagnetic means operative when energized to deflect the vibrational means from the normal position thereof so as to initiate vibratory movements when the liquid is below the certain level, sensing electromagnetic means including a core having a gap embracing the vibrational means, the sensing electromagnetic means being operative when energized to develop an alternating output, selectively operable means instantaneously energizing the driving electromagnetic means to produce a single deflection of the vibrational means and continuously energizing the sensing electromagnetic means, indicating means energized by the alternating output to indicate the absence of liquid at the certain level to be detected and circuit means monitoring the operation of the vibrational means, the circuit means including switch means actuated by the vibrational means when deflected to render the circuit means operative to indicate that the vibrational means is functioning properly.

12. In a liquid level indicator, the combination of a reservoir for fluid, a vibrational reed having a free end and a fixed end and operatively positioned within the reservoir so as to be exposed to the liquid at a certain level to be detected, the vibrational reed being constructed and arranged so as to be capable in the absence of liquid having the vibratory movement from a normal undeflected position and in the presence of liquid to be relatively incapable of vibratory movement due to the dampening effect of the liquid, a driving electromagnet operatively associated with the vibrational reed so as to deflect the vibrational reed from the normal position when energized, a sensing electromagnet including a core provided with a gap embracing the free end of the vibrational reed, the sensing electromagnet being operative when energized to develop an alternating output, selectively operable means instantaneously energizing the driving electromagnet to produce a single deflection of the vibrational reed and continuously energizing the sensing electromagnet, bistable circuit means having one state indicating the absence of liquid at the certain level to be detected and another state, the bistable circuit means being actuated by the alternating output so as to assume the state indicating the absence of liquid and circuit means operative when completed to cause the bistable circuit to assume the other state, the circuit means including a terminal associated with the driving electromagnet and engageable by the free end of the vibrational reed when deflected to complete the circuit means.

13. In a liquid level indicator, the combination of a fluid reservoir, vibrational means operatively positioned within the reservoir so as to be exposed to the liquid at a certain level to be detected, the vibrational means being so constructed and arranged as to be capable of vibratory movement from a normal position in the absence of liquid, driving electromagnetic means operative when energized to deflect the vibrational means from the normal position thereof so as to initiate vibratory movements when the liquid is below the certain level, sensing electromagnetic means including a core having a gap embracing the vibrational means, the sensing electromagnetic means being operative when energized to develop an alternating output, selectively operable means instantaneously energizing the driving electromagnetic means to produce a single deflection of the vibrational means and continuously energizing the sensing electromagnetic means, and indicator means energized by the alternating output to indicate the absence of liquid at the certain level to be detected.

14. In a liquid level indicator, the combination of a reservoir for liquid, a vibrational reed having a free end and a fixed end and arranged within the reservoir so as to be exposed to liquid at a certain level to be detected, the vibrational reed being capable in the absence of liquid having vibratory movement from a normal undeflected position and being relatively incapable in the presence of liquid of vibratory movement due to the dampening effect of the liquid, a driving electromagnet for deflecting the vibrational reed from the normal undeflected position so as to initiate vibratory movements thereof when there is an absence of liquid at the certain level, a sensing electromagnet including a core provided with an air gap embracing the free end of the vibrational reed, the sensing electromagnet being operative when energized to develop an output corresponding to the vibratory movements of the vibrational reed, selectively operable means instantaneously energizing the driving electromagnet to produce a single deflection of the vibrational reed and continuously energizing the sensing electromagnet, means energized by the output to indicate the absence of liquid at the certain level to be detected.

15. In a liquid level indicator, the combination of a reservoir for liquid, a vibrational reed having a free end and a fixed end and arranged within the reservoir so as to be exposed to liquid at a certain level to be detected, the vibrational reed being capable in the absence of liquid having vibratory movement from a normal undeflected position and being relatively incapable in the presence of liquid of vibratory movement due to the dampening effect of the liquid, a driving electromagnet for deflecting the vibrational reed from the normal undeflected position so as to initiate vibratory movements thereof when there is an absence of liquid at the certain level, a sensing electromagnet including a core provided with a gap embracing the free end of the vibrational reed, the sensing electromagnet being operative when energized to develop an alternating output corresponding to the vibratory movements of the vibrational reed, selectively operable means instantaneously energizing the driving electromagnet to produce a single deflection of the vibrational reed and including a DC source and a capacitor connected in series with the driving electromagnet, the selectively operable means being also operative to continuously energize the sensing electromagnet from the battery, indicator circuit means responsive to the alternating output, the indicator circuit means including an indicating device and switching means operative in response to the alternating output to cause the indicating device to be energized.

References Cited

UNITED STATES PATENTS

| | | | |
|---|---|---|---|
| 2,202,691 | 5/1940 | Gallot et al. | 335—87 X |
| 2,808,581 | 10/1957 | Findlay | 240—244 |
| 3,252,058 | 5/1966 | Close | 340—248 X |

THOMAS B. HABECKER, *Acting Primary Examiner.*

NEIL C. READ, *Examiner.*

D. MYER, *Assistant Examiner.*